Feb. 27, 1962 E. B. NOLT 3,022,622

BALER CONTROL DEVICE

Filed Sept. 24, 1959

INVENTOR.
EDWIN B. NOLT

BY Joseph Allen Brown

ATTORNEY

United States Patent Office 3,022,622
Patented Feb. 27, 1962

3,022,622
BALER CONTROL DEVICE
Edwin B. Nolt, New Holland, Pa., assignor to Sperry Rand Corporation, New Holland, Pa., a corporation of Delaware
Filed Sept. 24, 1959, Ser. No. 841,967
5 Claims. (Cl. 56—341)

This invention relates to automatic hay balers and more particularly to hay balers of the type having an engine mounted thereon.

Conventionally, when a hay baler is operated, the throttle of the engine is opened to a desired position and then the baling is carried out. When travelling over a field, there may be thin spots in the windrow and very little hay being picked up. Nevertheless, the engine will operate at its sets speed. Moreover, at the end of a row when the operator is turning to begin baling the next windrow, no hay is being picked up and again the baler engine is operating at baling speed.

A main object of this invention is to provide means on an engine mounted hay baler to control the speed of the engine responsive to the volume of material moving into the baler.

Another object of this invention is to provide engine control means in an automatic engine mounted hay baler which will slow down the engine when little or no material is moving into the baler and will speed up the engine when a large volume of hay is being relivered to the bale chamber.

Another object of this invention is to provide means incorporated into an automatic, engine mounted hay baler to minimize the wear and tear on the engine.

Another object of this invention is to provide control means of the character described which utilizes the windguards over the pick-up of the baler as a sensing means to control the throttle of the engine for operating the baler.

A still further object of this invention is to provide a control structure for regulating engine speed which is relatively simple and low in cost.

Other objects of this invention will be apparent hereinafter from the specification and from the recital in the appended claims.

Figure 1:
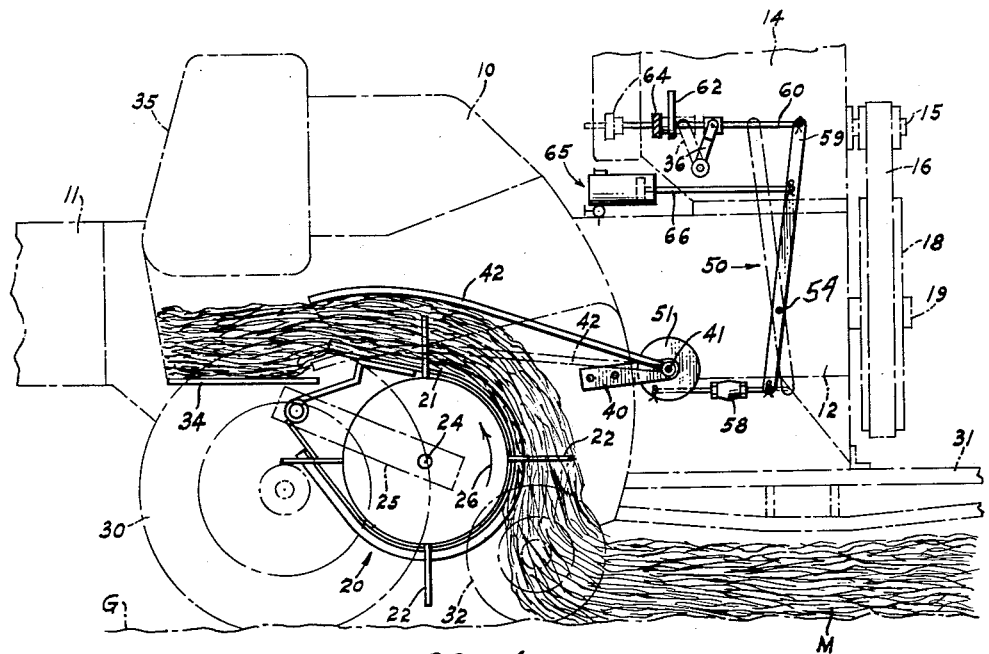
FIG. 1 is a diagrammatic side elevation of an engine mounted hay baler having control means thereon constructed according to this invention.
Figure 2:
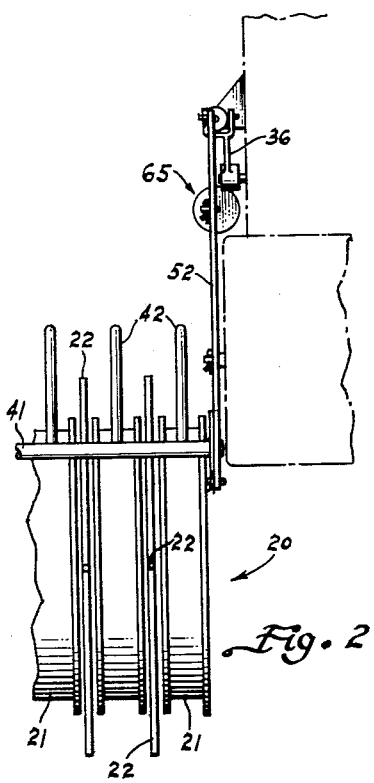
FIG. 2 is a fragmentary front view of the control means shown in FIG. 1.
Figure 3:
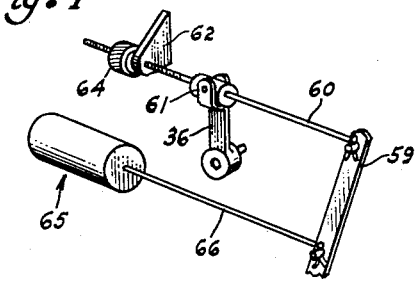
FIG. 3 is a perspective view showing the linkages which make up the control means.
Figure 3:
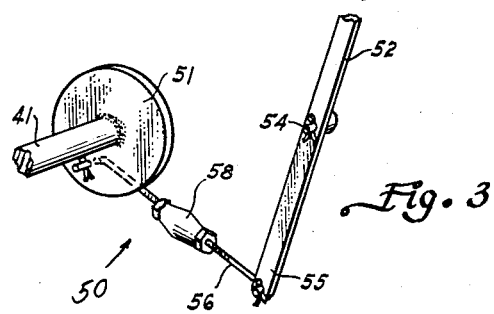

Referring now to the drawing by numerals of reference, and first to FIG. 1, 10 denotes a hay baler having a fore-and-aft extending bale chamber 11 in which crop material is adapted to be formed into bales. Mounted on the forward end 12 of the bale chamber is an engine 14 having an output shaft 15 connected through an endless belt 16 to a flywheel 18 the shaft 19 of which is operatively connected to various components of the baler. Extending laterally from the bale chamber 11 is a pick-up 20 which includes fore-and-aft extending laterally spaced stripper members 21 through which rake fingers 22 project. The rake fingers are carried on a reel including a cross shaft 24 mounted on support arms 25 suitably supported on the frame work of the baler. The pick-up rotates in the direction indicated by the arrow 26 in FIG. 1 being driven from suitable drive connections not shown.

The baler is supported for movement over the ground G on ground wheels 30. The baler has a tongue 31 which is connectable to the drawbar of a tractor, not shown, which pulls the baler. The pick-up has a ground wheel 32 adapted to raise and lower the pick-up responsive to ground variations. The windrowed crop material M is swept from the ground by the rotating pick-up and conveyed upwardly and rearwardly over the stripper members 21. Then, the material is deposited on a feed platform 34 which extends transversely from the bale case 11. Suitable feed mechanism contained in the housing 35 is operable to sweep the crop material from the platform 35 and deliver it to the bale chamber. Such mechanism is not shown since it plays no part in the present invention.

For controlling the speed of operation of the engine 14, there is provided a pivotal throttle 36. When viewed as shown in solid lines in FIG. 1, the throttle is opened. If the throttle is pivoted counterclockwise from such position to the position shown in dotted lines, the engine speed is reduced.

Pivotally mounted on arms 40 and extending transversely relative to the direction of travel of the baler and in front of the pick-up 20 is a cross shaft 41. Welded or otherwise affixed to the cross shaft 41 are windguard rods 42 which extend rearwardly and over the pick-up. When the windrow is full and there is a substantial amount of material being elevated by the pick-up 20, windguard rods 42 assume a position as shown in solid lines in FIG. 1. If the windrow becomes sparse or if the baler is making a turn and no crop material is being picked up, the windguard rods drop downwardly to the dotted line position shown in FIG. 1. The windguard rods prevent the crop material from being blown from the pick-up before it enters the baler and deposited on the platform 34. Moreover, the rods tend to compress and laterally distribute the crop material so that it is uniformly conveyed rearwardly.

The end of shaft 41 adjacent the bale case 11 has connected thereto a control device 50 for regulating the position of the throttle 36 responsive to up and down movement of the windguard rods 42. Device 50 comprises a disc 51 welded to the inboard end of shaft 41. As the windguard rods go up and down, shaft 41 pivots and the disc 51 pivots with it. Responsive to such pivoting of disc 51, a control lever 52 is pivoted. Lever 52 is pivotally supported on a pin 54 which projects through the lever between its ends. The lower end of the lever 55 has a link 56 connected to it. The opposite end of the link is connected to disc 51. It will be apparent, therefore, that as the disc 51 swings back and forth responsive to the pivoting of the shaft 41, the link 56 will be pushed or pulled to thereby pivot the lever 52. Fine adjustment means 58, in the nature of a turn buckle, is provided so that the effective length of the link 56 can be controlled to thereby properly position the upper end 59 of lever 52 responsive to the pivoting of the shaft 41. Such upper end of the lever is connected through a link 60 to the throttle 36. A pivotal connection 61 is provided between the link and the throttle. One end of link 60 passes through a guide block 62, the link having a stop 64 thereon to establish the upper limit of engine speed when the throttle is opened.

A dashpot 65 is connected to the lever 52 through a link 66, its purpose being to act as a delay mechanism to keep the control from cutting the throttle too fast while baling. For example, once hay has passed under the windguard rods 42 and no hay is picked up, the windguard rods will drop. Nevertheless, there is some hay on the platform 34 yet to be fed into the bale chamber and it is necessary to continue the operation of the baler for an additional feeding cycle. The dashpot will provide adequate delay to take care of this last portion of material.

When the baler is in normal operation and hay is moving over the pick-up and into the baler, the windguard rods 42 assume the solid line position shown in FIG. 1. When so disposed, the pivotal position of the shaft 41 and discs 51 is such that the lever 52 assumes the solid line position shown in FIG. 1. If the volume of material passing over the pick-up decreases or ceases, the windguard rods will drop and when the rods assume the position shown in dotted lines in FIG. 1, lever 52 assumes a pivoted position as indicated in dotted lines. In the first instance, throttle 36 is opened and in the second position it is pivoted counterclockwise to a closed position.

As a result, wear and tear on the engine of the baler is minimized and the baler idles when no crop material is being picked up and baled. The use of the windguards on the baler to provide the sensing means provides a simple and inexpensive control mechanism.

While this invention has been described in connection with a particular embodiment thereof, it will be understood that it is capable of further modification, and this application is intended to cover any variations, uses or adaptations of the invention following, in general, the principles of the invention and including such departures from the present disclosure as come within known or customary practice in the art to which the invention pertains and as fall within the scope of the invention or the limits of the appended claims.

Having thus described my invention, what I claim is:

1. In an automatic hay baler having an engine for operating the baler, a throttle on said engine movable between an opened position wherein the baler operates at baling speed and a closed position wherein the engine idles, a pick-up for elevating crop material from the ground and feeding it into the baler, and a pivotally mounted shaft having a plurality of windguard rods affixed thereto which extend over said pick-up, said rods having a normal position adjacent the pick-up and being movable away from the pick-up responsive to material passing over the pick-up, and said shaft being pivoted responsive to such movement, the combination of control means between said shaft and said throttle to close the throttle when the shaft is in one pivotal position and said rods are in said normal position and to open the throttle when the shaft is pivoted to another position on movement of said rods away from said normal position, said means comprising a lever connecting said shaft end to said throttle whereby when said shaft is pivoted said throttle is moved.

2. In an automatic hay baler as recited in claim 1 wherein said control means includes a mechanism for delaying the operation of said throttle on pivoting of said shaft from said other position to said one position.

3. In an automatic hay baler as recited in claim 2 wherein said shaft has a disc fixedly connected thereto, said lever being pivotally mounted, and there being a link connecting one end of the lever to said disc.

4. In an automatic hay baler as recited in claim 3 wherein means is provided on said link for adjusting the length of the link to thereby vary the connection of said lever and said shaft.

5. In an automatic hay baler having an engine for operating the baler, a throttle on said engine movable between an opened position wherein the engine operates at baling speed and a closed position wherein the engine idles, and a pick-up for elevating crop material from the ground and feeding it into the baler, the combination of a control device mounted on the baler including a member having a normal position adjacent said pick-up and movable away from the pick-up responsive to engagement with material passing over the pick-up, and means interconnecting said member to said throttle whereby the throttle is closed and the engine idles when said member is in said normal position and the throttle is opened to operate the engine at baling speed when the member is moved from said normal position and away from the pick-up.

References Cited in the file of this patent
UNITED STATES PATENTS

| | | |
|---|---|---|
| 2,327,448 | Olive | Aug. 24, 1943 |
| 2,377,807 | Pasturczak | June 5, 1945 |
| 2,658,323 | Russell | Nov. 10, 1953 |